(12) United States Patent
Suzuki

(10) Patent No.: US 7,924,322 B2
(45) Date of Patent: Apr. 12, 2011

(54) WHITE BALANCE PROCESSING FOR IMAGE PICKUP CORRESPONDING TO ZOOMING

(75) Inventor: Shoichi Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 11/008,952

(22) Filed: Dec. 13, 2004

(65) Prior Publication Data

US 2005/0128317 A1   Jun. 16, 2005

(30) Foreign Application Priority Data

Dec. 15, 2003   (JP) .................................. 2003-417198

(51) Int. Cl.
*H04N 9/73* (2006.01)
*H04N 5/262* (2006.01)

(52) U.S. Cl. .................................. 348/224.1; 348/240.3

(58) Field of Classification Search .... 348/223.1–225.1, 348/240.99–240.3
See application file for complete search history.

(56) References Cited

U.S. PATENT DOCUMENTS

| 5,448,292 | A | * | 9/1995 | Matsui et al. .............. 348/224.1 |
| 5,999,215 | A | * | 12/1999 | Tamura ........................ 348/345 |
| 6,853,401 | B2 | * | 2/2005 | Fujii et al. .................. 348/223.1 |
| 2003/0156206 | A1 | | 8/2003 | Ikeda et al. ................ 348/223.1 |
| 2004/0130632 | A1 | * | 7/2004 | Shiraishi .................... 348/223.1 |

FOREIGN PATENT DOCUMENTS

JP   2003-244723   8/2003

* cited by examiner

*Primary Examiner* — Timothy J Henn
(74) *Attorney, Agent, or Firm* — Fitzpatrick, Cella, Harper & Scinto

(57) ABSTRACT

An image pickup apparatus which is arranged so that a calculation portion calculates a first adjustment value for white balance adjustment from a first image obtained by capturing an image at first timing, a discrimination portion discriminates depending on objects conditions whether or not white balance of a second image obtained by capturing the image at second timing is subjected to white balance adjustment using the first adjustment value, and an adjustment portion performs the white balance adjustment on the second image using the first adjustment value on the basis of a discrimination result of the discrimination portion.

11 Claims, 6 Drawing Sheets

FIG. 6A

| R | G1 | | | R | G1 |
|---|----|---|---|---|----|
| G2 | B | | | G2 | B |
| R | G1 | | | R | G1 |
| G2 | B | | | G2 | B |

| R | G1 | | | R | G1 |
|---|----|---|---|---|----|
| G2 | B | | | G2 | B |

FIG. 6B

| R | G1 |
|---|----|
| G2 | B |

ONE BLOCK

WHITE BALANCE PROCESSING FOR IMAGE PICKUP CORRESPONDING TO ZOOMING

BACKGROUND OF THE INVENTION

1. Field of the Invention

The present invention relates to an image pickup apparatus and method using white balance processing.

2. Related Background Art

In an image pickup process performed by an image pickup apparatus such as a digital camera, a digital video camera, etc., a signal output from an image pickup element through a primary color filter is digitized by A/D conversion, and divided into blocks as shown in FIG. 6A. However, each block is configured by a unit including chrominance signals R, G1, G2, and B one by one as shown in FIG. 6B. For each block, a color evaluation value is calculated in the following equation.

$$C_x = \frac{R-B}{Y_i}$$

$$C_y = \frac{R+B-(G_1+G_2)}{Y_i}$$

$$Y_i = \frac{R+G_1+G_2+B}{4}$$

As shown in FIG. 7, a white axis can be obtained by plotting the color evaluation values Cx and Cy by photographing white color in advance under color temperature from high color temperature to low color temperature (for example, refer to Japanese Patent Application Laid-Open No. 2003-244723). Since there is variance of white color in an actual light source, flexibility referred to as a "white detection range" is provided to white color. In this case, when the white detection range a block plotted on the axes Cx and Cy is included in the white detection range, it is assumed that this block is white. The integrals SumR, SumG1, FumG2, and SumB color pixels included in the white detection range are calculated, and a white balance coefficient is calculated using the following equation where kWB_R, kWB_G1, kWB_G2, and kWB_B respectively indicate the white balance coefficients of the chrominance signals R, G1, G2, and B.

kWB_R=1.0/SumR kWB_G$_1$=1.0/SumG$_1$ kWB_G$_2$=1.0/SumG$_2$ kWB_B=1.0/SumB

However, in the method described above, when there is no white portion on the screen, the integral of the color in the white detection range is nearly zero. Therefore, a white balance coefficient cannot be correctly calculated. Furthermore, there is lower probability of a white portion in zooming as compared with wide photographing, so that it is difficult to designate the color temperature of a light source. For example, when a camera zooms in to photograph a target person, the rate of white portions decreases on the screen.

Additionally, when a camera zooms in on a target person to photograph that person, the following problems also occur. That is, at high color temperature, color evaluation values are distributed around the area A as shown in FIG. 7. Therefore, the scene can be defined as a high color temperature light source. However, when the flesh color is plotted on the axes Cx and Cy under the light source, it is distributed on the low color temperature side in the white detection range. Therefore, there is a smaller white color area on the screen, and the color evaluation values are distributed in the area B shown in FIG. 7 when human's skin is zoomed in. That is, the problem is that the flesh color looks pale in a photographed image due to the wrong recognition of the flesh color as the white color at a low color temperature. Therefore, an unexpected image can be presented to a photographer.

SUMMARY OF THE INVENTION

The present invention aims at providing an image pickup apparatus and method capable of performing appropriate white balance processing.

To attain the above-mentioned advantage, according to an aspect of the present invention, an image pickup apparatus comprises:

a calculation portion arranged to calculate a first adjustment value for white balance adjustment from a first image obtained by capturing an image at a first timing;

a discrimination portion arranged to discriminate depending on object conditions whether or not white balance of a second image obtained by capturing the image at a second timing is subjected to white balance adjustment using the first adjustment value; and an adjustment portion arranged to perform the white balance adjustment on the second image using the first adjustment value on the basis of a discrimination result of the discrimination portion.

According to another aspect of the present invention, an image pickup apparatus comprises:

a calculation portion arranged to calculate a first adjustment value for white balance adjustment from a first image obtained by capturing an image at a first focal length;

a discrimination portion arranged to discriminate depending on object conditions whether or not a second image obtained by capturing the image at a second focal length closer to a telephoto side than the first focal length is subjected to white balance adjustment using the first adjustment value; and an adjustment portion arranged to perform the white balance adjustment of the second image using the first adjustment value on the basis of a discrimination result of the discrimination portion.

In a still another aspect of the present invention, an image pickup apparatus comprises: a calculation portion arranged to calculate a first adjustment value for white balance adjustment from a first image obtained by capturing an image at a first focal length;

a detection portion arranged to detect that a focal length is changed to a second focal length closer to a telephoto side than the first focal length; and an adjustment portion arranged to perform white balance adjustment using the first adjustment value on a second image obtained by capturing the image at the second focal length on the basis of a detection result from the detection portion.

In a still another aspect of the present invention, an image pickup method comprises the steps of:

calculating a first adjustment value for white balance adjustment from a first image obtained by capturing an image at a first focal length;

discriminating depending on object conditions whether or not a second image obtained by capturing the image at a second focal length closer to a telephoto side than the first focal length is subjected to white balance adjustment using the first adjustment value; and performing white balance adjustment on the second image using the first adjustment value on the basis of a discrimination result in the discriminating step.

In a still another aspect of the present invention, an image pickup method comprises:

calculating a first adjustment value for white balance adjustment from a first image obtained by capturing an image at a first focal length;

detecting that a focal length is changed to a second focal length closer to a telephoto side than the first focal length; and performing white balance adjustment using the first adjustment value on a second image obtained by capturing the image at the second focal length on the basis of a detection result in the detecting step.

BRIEF DESCRIPTION OF THE DRAWINGS

Figures 6A, 6B:
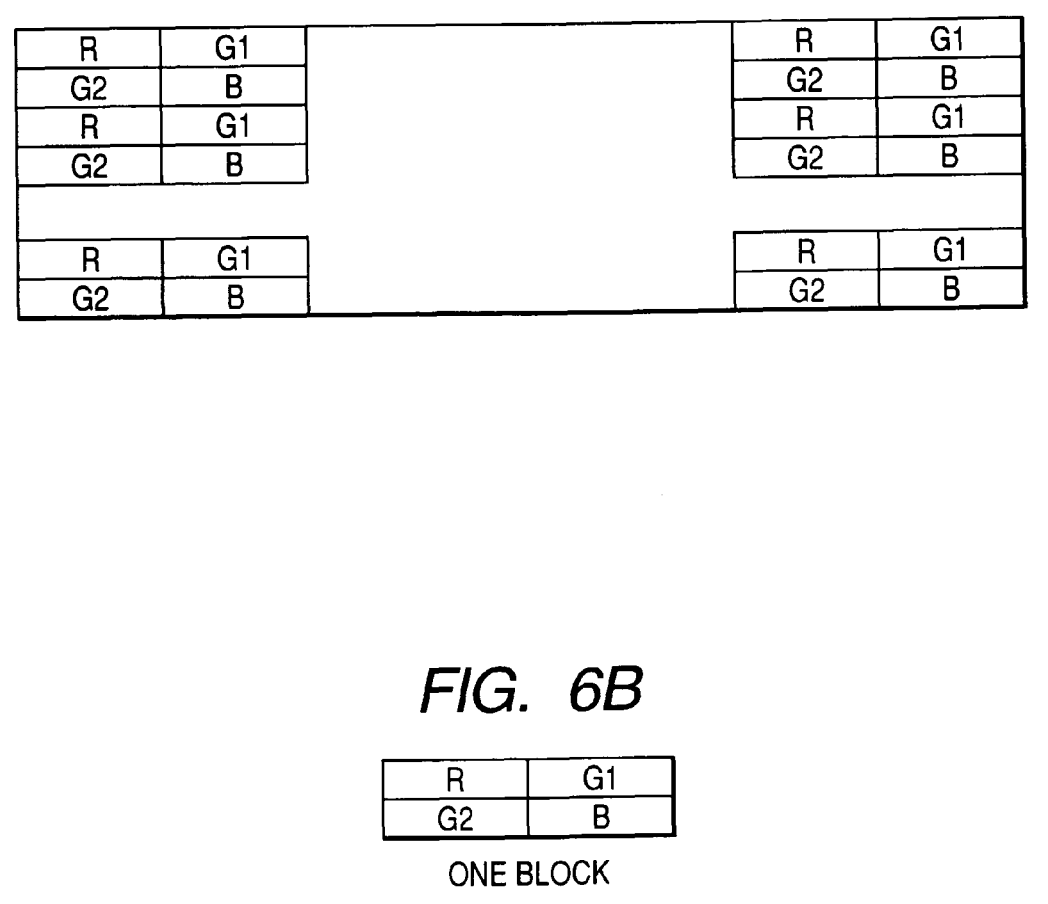

FIGS. 6A and 6B show examples of a color temperature detecting block; and

DESCRIPTION OF THE PREFERRED EMBODIMENTS

The embodiments of the present invention are described below in detail by referring to the attached drawings.

Figure 1:
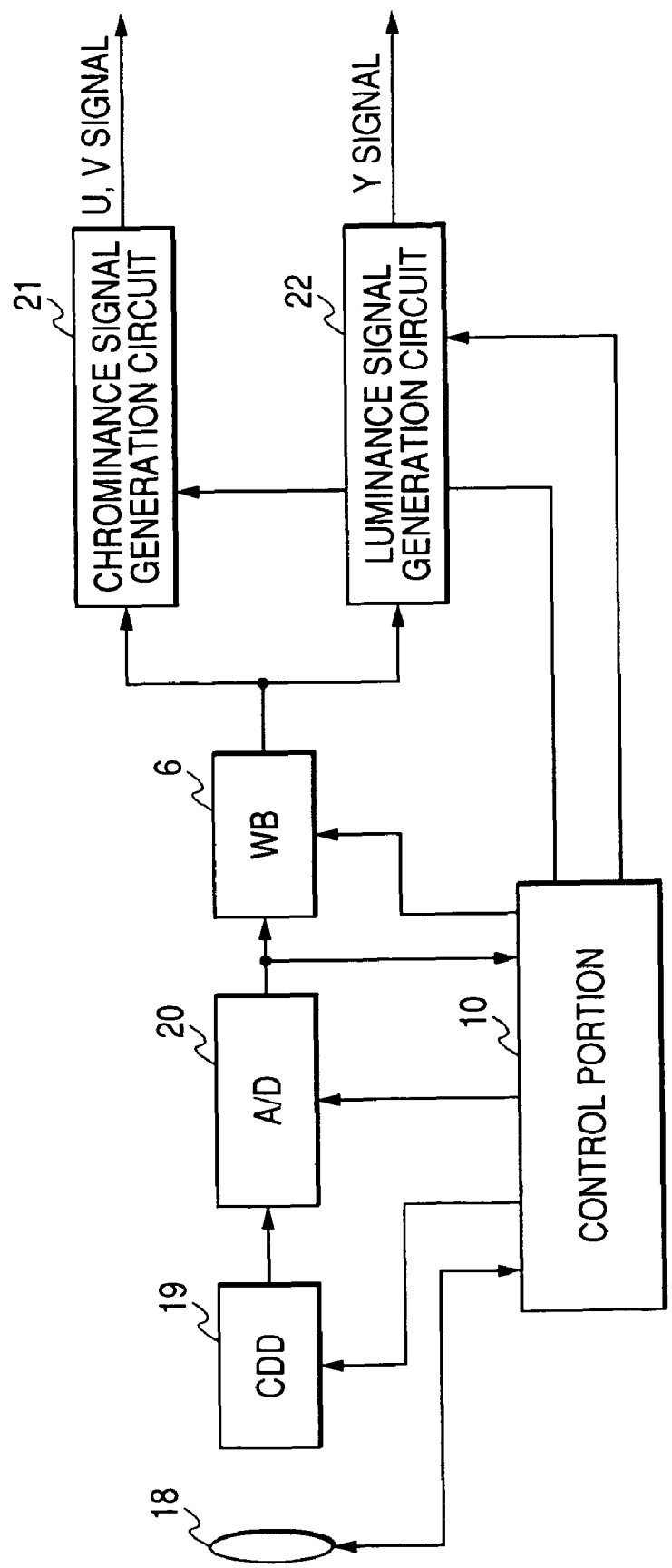
FIG. 1 is a block diagram showing an example of a configuration of the essential portion of the image pickup apparatus according to an embodiment of the present invention.

Example of Configuration of Image Pickup Apparatus According to Embodiment of the Present Invention FIG. 1 is a block diagram showing the outline of the configuration of the image pickup apparatus using white balance (hereinafter referred to as WB) processing according to an embodiment of the present invention.

In FIG. 1, the light passing through a lens 18 is received by a CCD 19, and an output signal is converted into a digital signal by an A/D converter 20 and then subjected to white balance in a WB circuit 6 according to the present embodiment. Subsequently, a chrominance signal generation circuit 21 generates color difference signals U and V, and a luminance signal generation circuit 22 generates a luminance signal Y, thereby obtaining a color image.

The position control (wide/zoom) of the lens 18 and the control of signal processing of other elements are performed by a control portion 10 comprising a CPU, ROM, RAM, etc. However, in case that a single chip IC is used for each element, each element may have the configuration having its own control portion. In this case, the WB circuit 6 has its own control portion for controlling the following operations.

The process on the generated color difference signals U and V and the luminance signal Y may be different depending on purpose and use of each image pickup apparatus, but it is not the essential portion of the present embodiment, and the explanation is omitted here.

Figure 2:
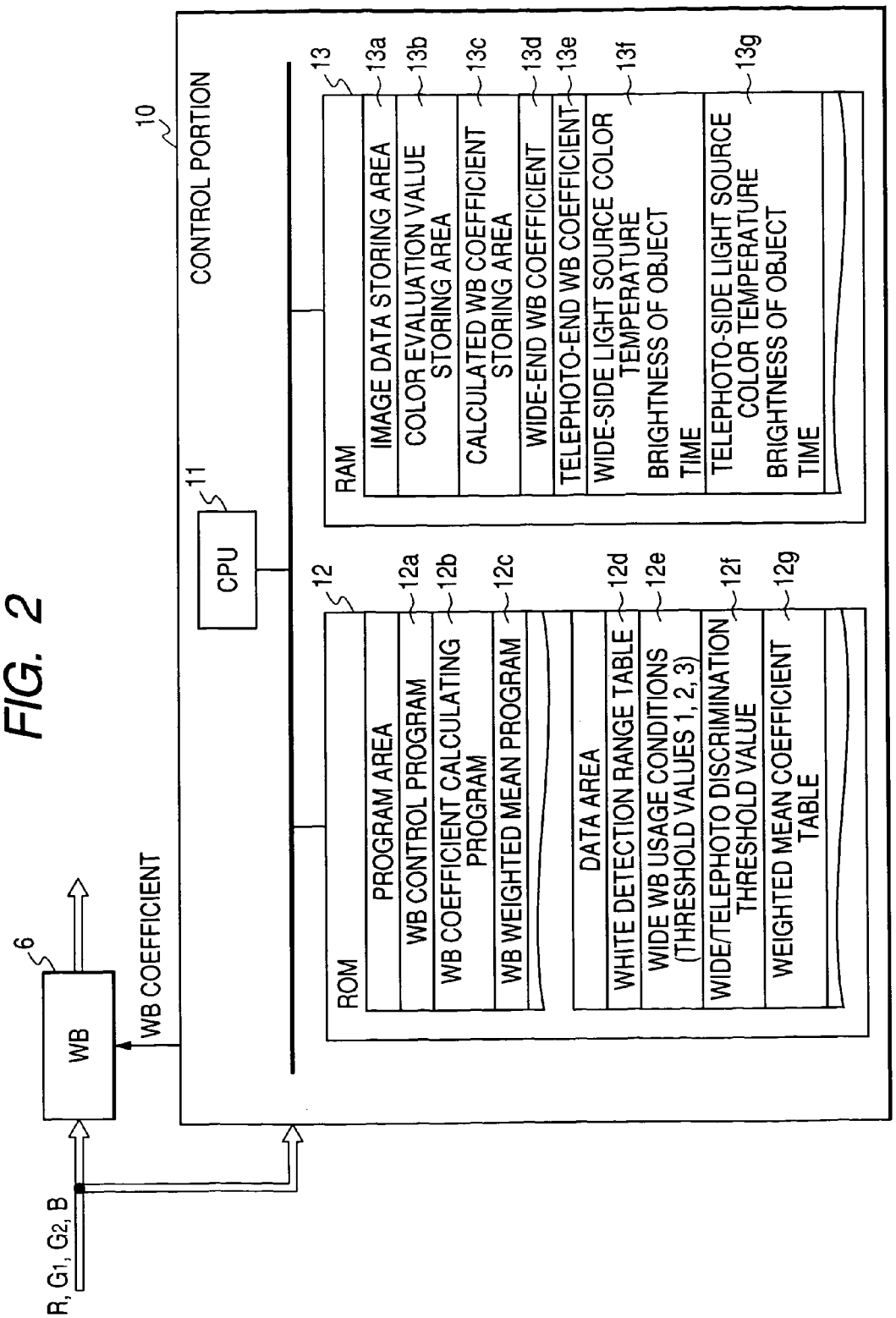
FIG. 2 is a block diagram showing an example of a configuration of the portion relating to white balance processing according to an embodiment of the present invention.

FIG. 2 is a block diagram showing the details of an example of the configuration of the WB circuit control of the image pickup apparatus to the WB circuit 6 and the control portion 10 shown in FIG. 1.

The digital image signals R, G1, G2, and B are input on a block basis to the WB circuit 6 and the control portion 10. From the control portion 10, the WB coefficient determined based on the input digital image signals R, G1, G2, and B is provided to the WB circuit 6, and the WB circuit 6 performs the white balance processing.

The control portion 10 comprises a CPU 11 for arithmetic operation control, ROM 12 for storing a fixed program and data, and RAM 13 as primary storage. In this example, the white balance processing according to the present embodiment is fixed in advance, and a processing program, a table, and wide WB usage conditions, etc. are stored in the ROM 12. However, they can be stored in rewritable non-volatile RAM so as to be changed.

Figure 7:
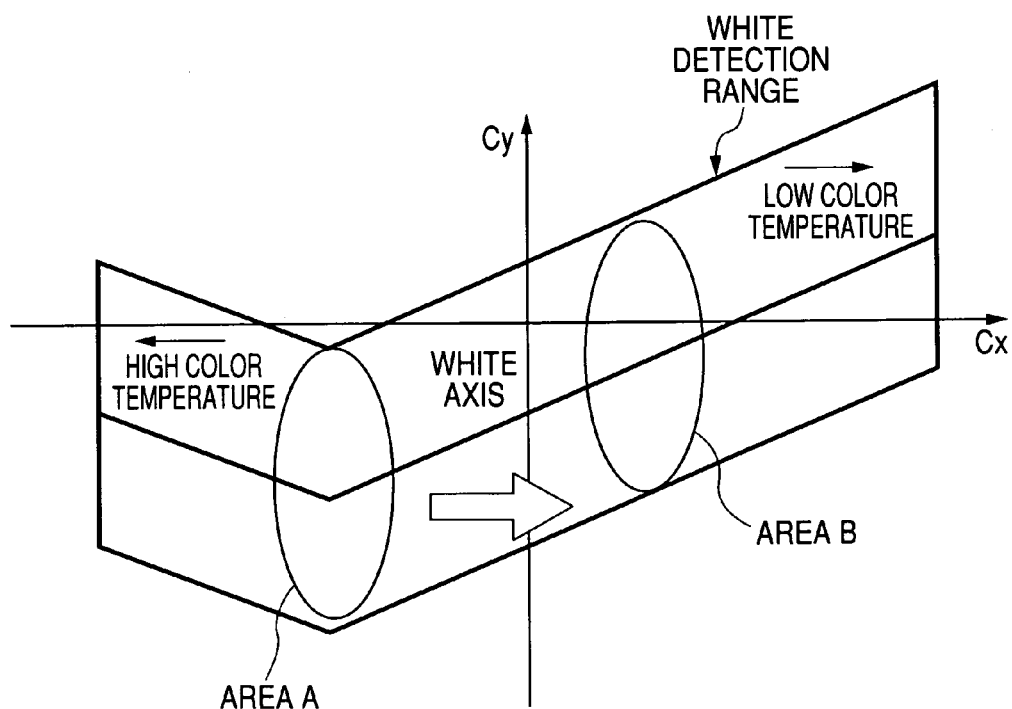
FIG. 7 shows an example of a white detection range.

The ROM 12 includes a program storing area and a data storing area. In the present embodiment, the program storing area comprises a WB control program 12a shown in FIGS. 3 and 4, a WB coefficient calculating program 12b for obtaining a WB coefficient as explained in the description of the background art, and a WB weighted mean program 12c for obtaining another WB coefficient from a weighted mean, and the data storing area comprises a white detection range table 12d as shown in FIG. 7, a storing area 12e having thresholds 1 to 3 which are wide WB usage conditions, a storing area 12f having a threshold (focal length) for wide/telephoto discrimination, and a weighted mean coefficient table (FIG. 5) 12g for use in another example of the present embodiment.

The RAM 13 comprises: an image data storing area 13a for storing necessary amount of data required in WB processing of input image data; a color evaluation value storing area 13b for storing a color evaluation value explained in the description of the background art; a calculated WB coefficient storing area 13c for storing a WB coefficient calculated in real time; a wide-end WB coefficient 13d for storing the latest WB coefficient at wide-side; a telephoto-end WB coefficient 13e for storing the latest WB coefficient at telephoto-side; a storing area 13f for a wide side light source color temperature, the brightness of an object, and time, which are used in discriminating wide WB usage conditions; and a storing area 13g for a telephoto-side light source color temperature, the brightness of an object, and time, which are used in discriminating wide WB usage conditions.

In the present embodiment, using the data according to the program stored in the ROM 12 and using the area of the RAM 13, a WB coefficient is calculated from the image data R, G1, G2, and B input in the CPU 11 to be selected, and the appropriate white balance processing can be attained even in the zooming operation in which there is a high possibility that the rate of a white area decreases in the WB circuit 6.

Example of Operation of Image Pickup Apparatus According to Present Embodiment

An example of white balance processing in the image pickup apparatus according to an embodiment of the present invention with the configuration shown in FIGS. 1 and 2 is described below.

Figure 3:
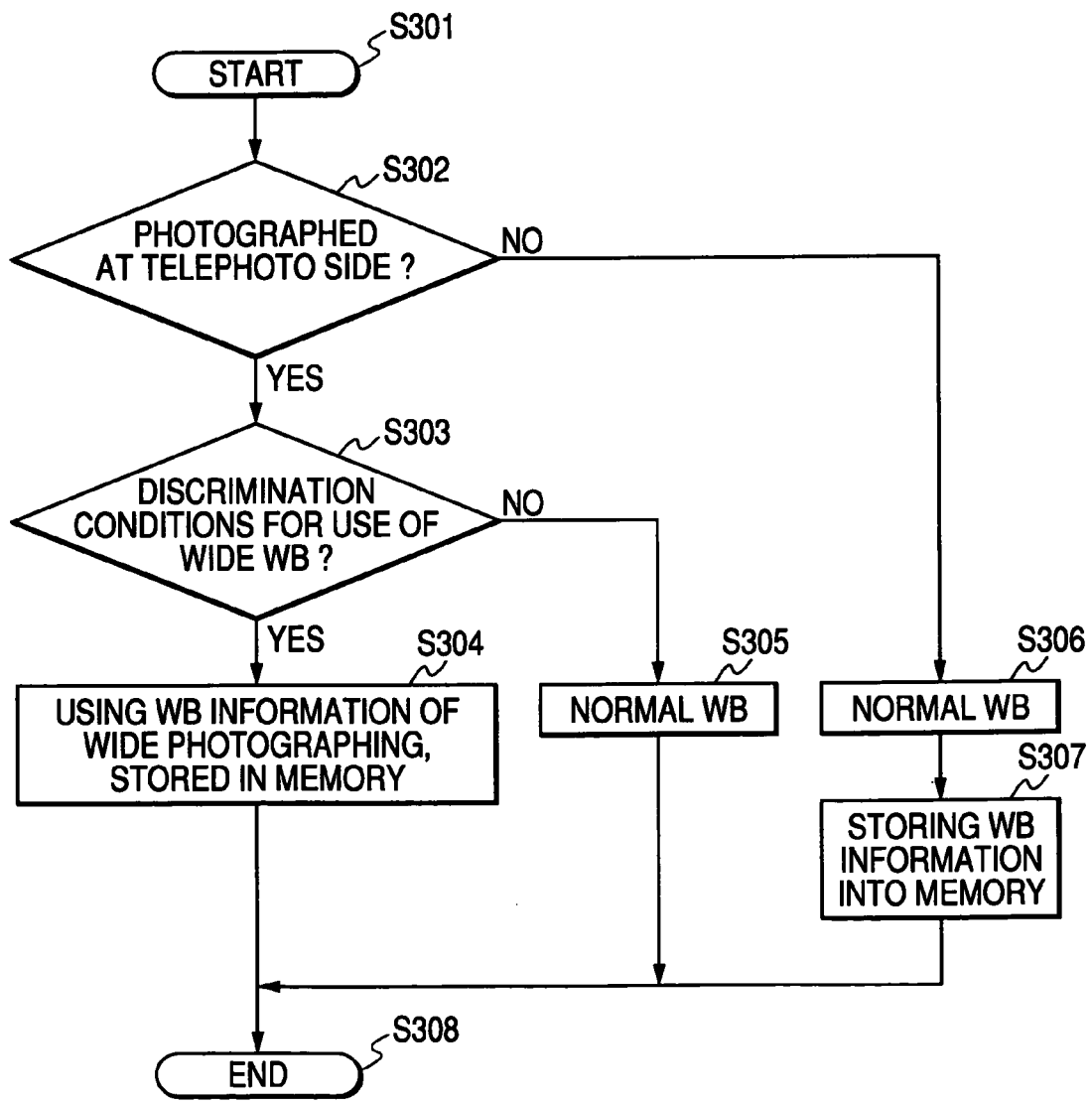
FIG. 3 is a flowchart showing an example of the procedure of white balance processing according to an embodiment of the present invention.

FIG. 3 is a flowchart of an example of the procedure of the white balance processing according to the present embodiment.

In FIG. 3, photographing is started in step S301. In step S302, it is determined which is performed, telephoto-side photographing or wide-side photographing. In the discriminating method, a threshold is set for a zoom position, and the wide-side photographing is discriminated when the focal length is equal to or smaller than the threshold.

For example, the threshold is set in the range from 70 to 105 mm in terms of 35 mm. Otherwise, the discrimination can be made by comparison with the focal length of the previous photographing.

When wide photographing is discriminated, normal white balance processing is performed in step S306. In step S307, the white balance coefficient calculated in step S306 is stored in the memory of the image pickup apparatus. If it is discriminated in step S302 that the telephoto-side photographing is being performed, the white balance coefficient at the telephoto-end side is determined depending on the discrimination result obtained in step S303. The discrimination in step S303 returns a true value (YES) when the following conditions are all true.

Condition 1: The difference between the color temperature of the light source calculated during wide-side photographing and the color temperature of the light source calculated during telephoto-side photographing is equal to or larger than a threshold.

Condition 2: The difference between the brightness of an object during wide-side photographing and the brightness of the object during telephoto-side photographing equal to or smaller than a threshold.

Condition 3: The difference between the wide-side photographing time and the telephoto-side photographing time is equal to or smaller than a threshold.

The above-mentioned conditions are described below in detail.

Condition 1: The difference between the color temperature of the light source calculated during wide-side photographing and the color temperature of the light source calculated during telephoto-side photographing is equal to or larger than a threshold.

For example, assume that the wide photographing is performed as portrait photographing and the human's skin is zoomed in to be photographed. During wide photographing, the ratio of a target person to the screen is not so large. Therefore, correct white balance processing can be performed with a small influence of the distribution B shown in FIG. 7. However, when a zooming-in operation is performed and the ratio of the flesh color to the screen becomes larger, the influence of the distribution B shown in FIG. 7 is outstanding, and the specified color temperature is lower than the actual value. That is, when the color temperature specified during telephoto-side photographing is considerably different from the color temperature of the light source specified during wide photographing, it is assumed that any influence of a chromatic color works, thereby using the color temperature specified during wide photographing.

Condition 2: The difference between the brightness of an object during wide-side photographing and the brightness of the object during telephoto-side photographing equal to or smaller than a threshold.

When the light source during telephoto-side photographing is largely different from the light source during wide-side photographing, the color temperature specified during wide photographing cannot be used. Then, the Bv value indicating the brightness of an object is calculated from the shutter speed Tv, the diaphragm Av, and the sensitivity Sv, and it is assumed that the light sources are identical to each other if the difference between the Bv value during wide-side photographing and the Bv value during telephoto-side photographing is not large.

Condition 3: The difference between the wide-side photographing time and the telephoto-side photographing time is equal to or smaller than the threshold.

The wide-side photographing time and the telephoto-side photographing time are stored in the memory of the camera, and if they are nearly the same, then it is assumed that the light sources are identical to each other.

When the above-mentioned conditions are all true, but it is assumed that the color temperature of the light source has been incorrectly recognized due to the influence of a chromatic color, while the light source during telephoto-side photographing is the same as that during the wide-side photographing, and then, the white balance information at the wide-side is used in step S304. If any one of the conditions is false, the normal white balance processing is performed.

As described above, the flowchart shown in FIG. 3 explained according to the present embodiment is discriminated and applied depending on the specific mode such as not only the normal photographing mode, but also, for example, the portrait photographing mode with the zooming status, the macro photographing mode, the landscape (distance) photographing mode with the wide status, etc.

Other Examples of WB Control

Figure 4:
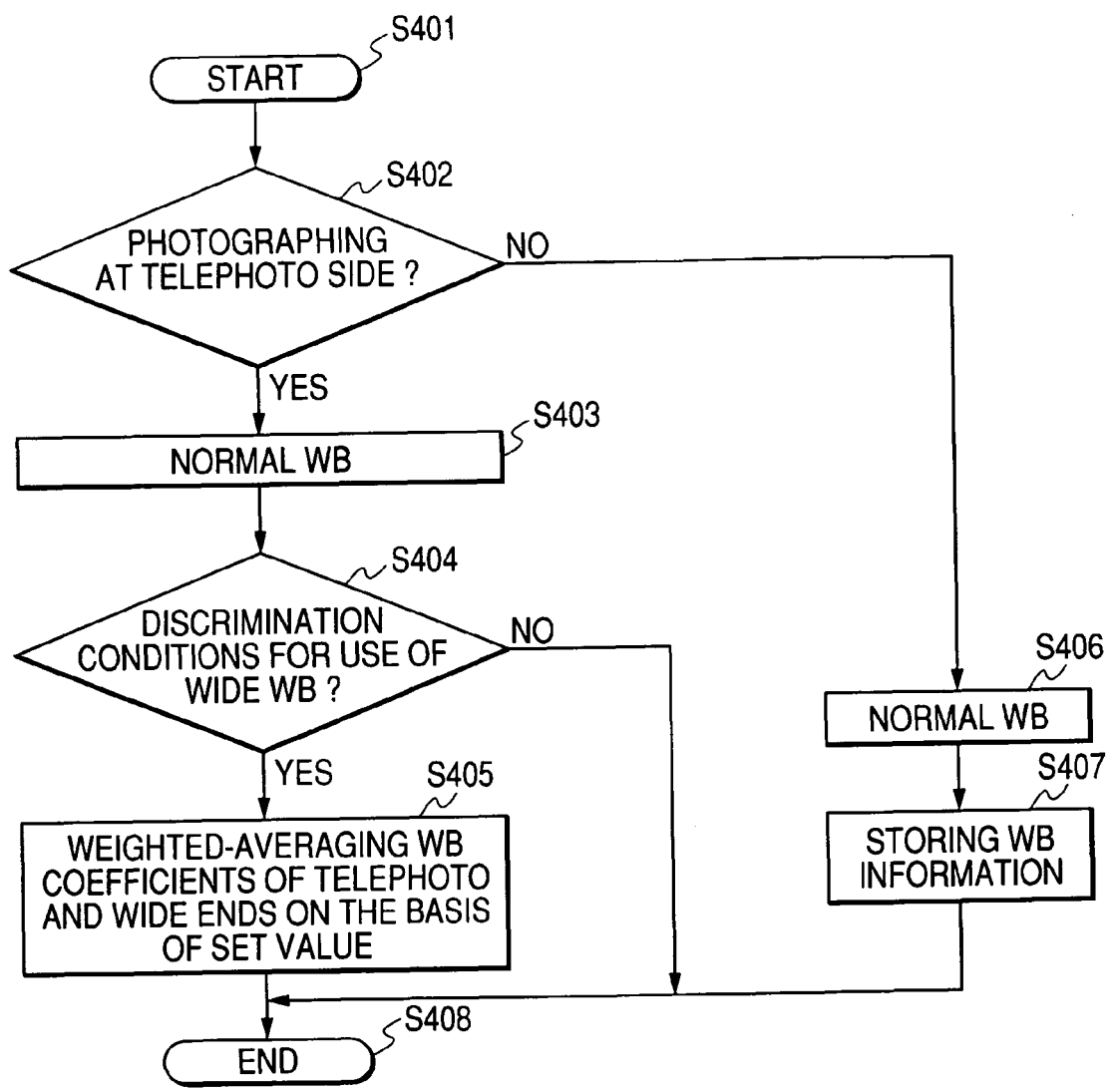
FIG. 4 is a flowchart showing another example of the procedure of white balance processing according to an embodiment of the present invention.

FIG. 4 is a flowchart of another example of the procedure of the white balance processing according to the present embodiment.

In FIG. 4, the photographing is started in step S401. In step S402, as in step S302 shown in FIG. 3, it is determined which is performed, the telephoto-side photographing or the wide-side photographing. If the wide photographing is discriminated, the normal white balance processing is performed in step S406. In step S407, the white balance coefficient calculated in step S406 is stored in the memory of the image pickup apparatus.

If it is determined in step S402 that the telephoto-side photographing is performed, the normal white balance processing is performed in step S403. Furthermore, in step S404, the above-mentioned three conditions are applied. If the discrimination is true, the weighted mean is calculated between the white balance coefficient obtained during wide-end photographing (step S407) and the white balance coefficient (step S403) based on the parameter calculated in step S404, and the result is set as a final white balance coefficient (step S405).

Figure 5:
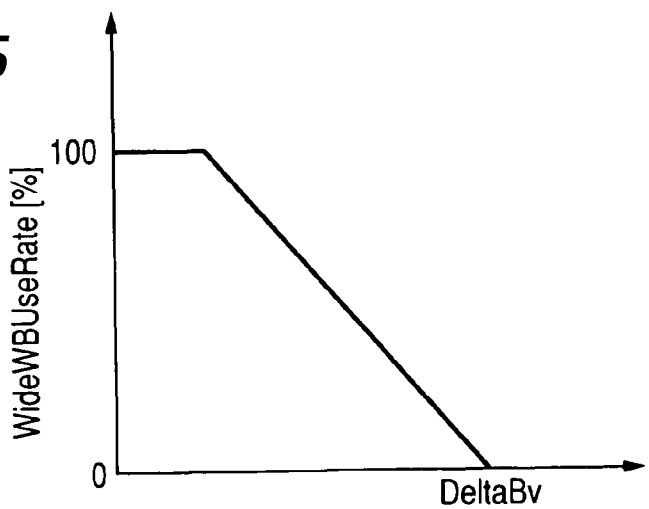
FIG. 5 shows the rate at which a white balance coefficient calculated during wide-end photographing is used in a weighted mean shown in FIG. 4.

For example, a difference under condition 2 between the brightness of an object during wide-end photographing and the brightness of an object during telephoto-end photographing is used as a parameter for a weighted mean, as follows: At this time, assuming that the rate at which the white balance coefficient during wide-end photographing is used is defined as WideWBUseRate, and the difference between the brightness of an object during wide-end photographing and the brightness of an object during telephoto-end photographing is defined as DeltaBv, the relationship among them can be represented as shown in FIG. 5. Thus, when DeltaBv is small, it is assumed that the light source of the wide-end photographing and the light source of telephoto-end photographing are identical to each other, and then the rate at which the white balance coefficient calculated at the wide-end is used is set to a high value. WideWBUseRate can be calculated from a difference between the color temperature specified during wide-end photographing and the color temperature specified during telephoto-end photographing and a difference between the time at wide-end photographing and the time at telephoto-end photographing.

In accordance with the method described above, a weighted mean between the white balance coefficient obtained during wide-end photographing and the white balance coefficient obtained during telephoto-end photographing is obtained. The method of calculating the weighted mean is explained. Assume that Cx and Cy of the white balance coefficient obtained during wide-end photographing are defined as WideCx and WideCy, respectively, and Cx and Cy of the white balance coefficient obtained during telephoto-end photographing are defined as TeleCx and TeleCy, respectively. Also assume that Cx and Cy of the final white balance coefficient are defined as FinalCx and FinalCy, respectively. Then FinalCx can be calculated by the following equation.

$$FinalCx=(WideCx\times WideWBUseRate+TeleCx\times(100-WideWBUseRate))/100$$

Furthermore, assuming that the distance between the white axis and the point (WideCx, WideC) is defined as WideDisCy, and the distance between the white axis and the point (TeleCx, TeleCy) is defined as TeleDisCy, then FinalCy can be calculated by the following equation.

$$FinalCy=(WideDisCy\times WideWBUseRate+TeleDisCy\times(100-WideWBUseRate))/100+CyOnline$$

where CyOnline is a Cy value on the white axis for FinalCx.

Using the method of calculating a weighted mean, as described above, the final white balance coefficient is calculated.

In the above-mentioned embodiment, a digital camera is explained as an example. However, the present invention is not limited to a digital camera, but a digital video camera, a mobile phone with a digital camera, a scanner, etc. can also be included. Also included is capturing an image by a remote operation in which a release instruction is provided from a PC connected with a camera via a cable or through wireless link. It is also included in the scope of the present invention that various devices are operated by providing the computer in the device or system connected to various devices with the program code of the software to realize the function of the embodiments, and operating the various devices according to the program stored in the computer (CPU or MPU) of the system or the device.

In this case, the program code itself of the software realizes the function of the embodiments, and the program code itself and the means for providing the program code for the computer, for example, the record medium storing the program code configure the present invention. The record medium storing the program code can be, for example, a flexible disk, a hard disk, an optical disk, a magneto-optical disk, CD-ROM, a magnetic tape, a non-volatile memory card, ROM, etc.

The functions of the above-mentioned embodiments can be realized by the computer executing the program code, and the functions of the above-mentioned embodiments can be realized by the program code cooperating with the OS (operating system) or other application software, etc. operating in the computer. In these cases, it is obvious that the program code is included in the embodiments of the present invention.

After a provided program code is stored in the memory in the function expansion board of the computer or the function expansion unit connected to the computer, the CPU, etc. in the function expansion board or the function expansion unit performs all or a part of the actual process, and the process realizes the functions of the above-mentioned embodiments according to the instruction of the program code. In these cases it is obvious that the program code is included in the present invention.

According to the present embodiment, an image pickup method and apparatus can be provided, which are capable of performing appropriate white balance processing in the zooming operation in which there is a high possibility that the rate of a white area decreases.

That is, using a white balance coefficient calculated in the wide-end photographing in which there is a high possibility that a white area can be present even in a zooming operation in which there is a high possibility of decrease of a rate of a white area, appropriate white balance processing can be performed. For example, although there is a high possibility of a chromatic color area with a white area decreased due to an operation of zooming in on a target person, appropriate white balance processing can be performed.

Many widely different embodiments of the present invention may be constructed without departing from scope of the present invention. It should be understood that the present invention is not limited to the specific embodiments described in the specification, except as defined in the appended claims.

This application claims priority from Japanese Patent Application No. 2003-417198 filed Dec. 15, 2003, which is hereby incorporated by reference herein.

What is claimed is:

1. An image pickup apparatus, comprising:
a calculation unit arranged to calculate an adjustment value for adjusting white balance, on the basis of an image obtained by capturing an object image;
a storage unit arranged to store the adjustment value calculated by the calculation unit; and
an adjustment unit arranged to adjust the white balance of the obtained image on the basis of the adjustment value calculated by the calculation unit,
wherein if a focal length is a first focal length on a wide side, the calculation unit calculates a first adjustment value on the basis of a first image obtained by capturing the object image at the first focal length, to be stored in the storage unit and the adjustment unit adjusts the white balance of the first image on the basis of the calculated first adjustment value, and if the focal length is changed from the first focal length to a second focal length toward a telephoto side than the first focal length to obtain a second image by capturing the object image, then the adjustment unit adjusts the white balance of the obtained second image using the first adjustment value stored in the storage unit at the first focal length, in a case where all of the following three object conditions A to C are satisfied,
A: a difference between a color temperature of an object at a timing of photographing at the first focal length and that at a timing of photographing at the second focal length is equal to or larger than a first predetermined value;
B: a difference between brightness of the object at a timing of photographing at the first focal length and that at a timing of photographing at the second focal length is equal to or smaller than a second predetermined value; and
C: a time difference between a timing of photographing at the first focal length and a timing of photographing at the second focal length is equal to or smaller that a third predetermined value.

2. The image pickup apparatus according to claim 1, further comprising a discrimination unit arranged to discriminate whether or not each of the three object conditions is satisfied, the discrimination unit calculating the color temperature of the object at the timing of photographing at the first focal length and that at the timing of photographing at the second focal length on the basis of the first and second images, respectively.

3. The image pickup apparatus according to claim 2, wherein the discrimination unit calculates each of the brightness of the object on the basis of photographing conditions of the object.

4. The image pickup apparatus according to claim 1, further comprising a memory arranged to store the time difference between the timing of photographing at the first focal length and the timing of photographing at the second focal length.

5. An image pickup apparatus, comprising:
a calculation unit arranged to calculate a first adjustment value for white balance adjustment from a first image obtained by capturing an image at a first focal length;
a discrimination unit arranged to determine, if the focal length is changed from the first focal length to a second focal length toward a telephoto side than the first focal length, whether or not all of the following three object conditions A to C are satisfied,
  A: a difference between a color temperature of an object at a timing of photographing at the first focal length and that at a timing of photographing at the second focal length is equal to or larger than a first predetermined value;
  B: a difference between brightness of the object at a timing of photographing at the first focal length and that at a timing of photographing at the second focal length is equal to or smaller than a second predetermined value; and
  C: a time difference between a timing of photographing at the first focal length and a timing of photographing at the second focal length is equal to or smaller that a third predetermined value; and
an adjustment unit arranged to perform the white balance adjustment of a second image obtained by capturing the object image at the second focal length, by using the first adjustment value in a case where a discrimination result of the discrimination unit shows that all three of the object conditions are satisfied.

6. The image pickup apparatus according to claim 5, wherein the discrimination unit calculates the color temperature of the object at the timing of photographing at the first focal length and that at the timing of photographing at the second focal length on the basis of the first and second images, respectively.

7. The image pickup apparatus according to claim 5, wherein the discrimination unit calculates the brightness of the object on the basis of photographing conditions of the object.

8. The image pickup apparatus according to claim 5, further comprisins a memory arranged to store the timing of photographing at the first focal length and the timing of photographing at the second focal length.

9. An image pickup method, comprising:
a step of calculating an adjustment value for adjusting white balance, on the basis of an image obtained by capturing an object image; and
adjusting the white balance of the obtained image on the basis of the adjustment value calculated in the calculation step
wherein if a focal length is a first focal length on a wide side, the calculation step calculates a first adjustment value on the basis of a first image obtained by capturing the object image at the first focal length and the adjustment step adjusts the white balance of the first image on the basis of the calculated first adjustment value, and if the focal length is changed from the first focal length to a second focal length toward a telephoto side than the first focal length to obtain a second image by capturing the object image, then the adjustment step adjusts the white balance of the obtained second image using the first adjustment value calculated in the calculation step, in a case where all of the following three object conditions A to C are satisfied,
  A: a difference between a color temperature of the object at a timing of photographing at the first focal length and that at a timing of photographing at the second focal length is equal to or larger than a first predetermined value;
  B: a difference between brightness of the object at a timing of photographing at the first focal length and that at a timing of photographing at the second focal length is equal to or smaller than a second predetermined value; and
  C: a time difference between a timing of photographing at the first focal length and a timing of photographing at the second focal length is equal to or smaller that a third predetermined value.

10. An image pickup method, comprising:
calculating a first adjustment value for white balance adjustment from a first image obtained by capturing an image at a first focal length;
if the focal length is changed from the first length to a second focal length toward a telephoto side than the first focal length, determining whether or not all of the following three object conditions A to C are satisfied,
  A: a difference between a color temperature of an object at a timing of photographing at the first focal length and that at a timing of photographing at the second focal length is equal to or larger than a first predetermined value;
  B: a difference between brightness of the object at a timing of photographing at the first focal length and that at a timing of photographing at the second focal length is equal to or smaller than a second predetermined value; and
  C: a time difference between a timing of photographing at the first focal length and a timing of photographing at the second focal length is equal to or smaller that a third predetermined value; and
performing the white balance adjustment of the second image obtained by capturing the object image at the second focal length, by using the first adjustment value in a case where a discrimination result in the discriminating step shows that all three of the object conditions are satisfied.

11. A computer-executable program stored on a computer-readable storage medium, comprising a program code for causing a computer to execute the image pickup method according to any one of claims 9 and 10.

* * * * *